US006995105B1

(12) United States Patent
Wache et al.

(10) Patent No.: US 6,995,105 B1
(45) Date of Patent: Feb. 7, 2006

(54) USE OF WATER-SOLUBLE MIXED POLYMERS AS A FLOWING MEDIUM AND/OR AS A HARDENING RETARDER FOR REFRACTORY MATERIALS WHICH CONTAIN ALUMINATE CEMENT

(75) Inventors: Steffen Wache, Trostberg (DE); Johann Plank, Trostberg (DE); Konrad Wutz, Trostberg (DE); Manfred Bichler, Engelsberg (DE)

(73) Assignee: SKW Polymers GmbH, Trostberg (DE)

( * ) Notice: Subject to any disclaimer, the term of this patent is extended or adjusted under 35 U.S.C. 154(b) by 0 days.

(21) Appl. No.: 09/720,963

(22) PCT Filed: Jul. 8, 1999

(86) PCT No.: PCT/EP99/04813

§ 371 (c)(1), (2), (4) Date: Feb. 13, 2001

(87) PCT Pub. No.: WO00/02827

PCT Pub. Date: Jan. 20, 2000

(30) Foreign Application Priority Data

Jul. 9, 1998 (DE) ................................ 198 30 760

(51) Int. Cl.
*C04B 35/101* (2006.01)
*C08K 3/22* (2006.01)
*C08K 3/34* (2006.01)
*C08L 33/26* (2006.01)

(52) U.S. Cl. ...................... 501/128; 501/108; 501/124; 501/125; 501/127; 501/129; 501/130; 524/437; 524/548; 524/549; 524/555; 524/556; 524/650

(58) Field of Classification Search .................. 501/94, 501/133; 524/437, 650
See application file for complete search history.

(56) References Cited

U.S. PATENT DOCUMENTS

| | | | | | |
|---|---|---|---|---|---|
| 4,015,991 | A | * | 4/1977 | Persinski et al. | 106/90 |
| 4,331,773 | A | * | 5/1982 | Hongo et al. | 501/128 |
| 4,334,029 | A | * | 6/1982 | Naito et al. | 501/109 |
| 4,608,353 | A | * | 8/1986 | Nagayama | 501/97.2 |
| 4,674,574 | A | * | 6/1987 | Savoly et al. | 166/293 |
| 4,888,059 | A | * | 12/1989 | Yamaguchi et al. | 106/314 |
| 5,472,051 | A | | 12/1995 | Brothers | 166/293 |
| 5,911,820 | A | * | 6/1999 | Satoh et al. | 106/823 |
| 5,912,284 | A | * | 6/1999 | Hirata et al. | 524/5 |

FOREIGN PATENT DOCUMENTS

| | | | | |
|---|---|---|---|---|
| EP | 607039 | A1 | * | 7/1994 |
| EP | 0 632 186 | | | 1/1995 |
| EP | 0 633 390 | | | 1/1995 |
| EP | 633390 | A1 | * | 1/1995 |
| JP | 07291691 | A | * | 11/1995 |
| WO | WO 9528362 | A1 | * | 10/1995 |

* cited by examiner

*Primary Examiner*—Robert Sellers
(74) *Attorney, Agent, or Firm*—Fulbright & Jaworski L.L.P.

(57) ABSTRACT

The use of a three-component water-soluble polymer comprising 5–90% by weight of a component a), preferably of the maleic acid, fumaric acid or itaconic acid type, 5–90% by weight of a component b) essentially from the group consisting of 2-acrylamido-2-methylpropanesulfonic acid, vinylsulfonic acid and vinylphosphonic acid, and 5–90% by weight of a component c) comprising acrylic acid, methacrylic acid, acrylamide or methacrylamide, as fluidizer for refractory compositions comprising alumina cement is described. The copolymer, which has a preferred molecular weight $M_w$ of <50,000, can also be combined with further quality-improving additives such as silica, lime or soda and further customary additives for refractory compositions.

26 Claims, No Drawings

USE OF WATER-SOLUBLE MIXED POLYMERS AS A FLOWING MEDIUM AND/OR AS A HARDENING RETARDER FOR REFRACTORY MATERIALS WHICH CONTAIN ALUMINATE CEMENT

The present invention relates to the use of water-soluble copolymers as claimed in claim 1 as fluidizers and/or setting retarders for refractory compositions comprising alumina cement, e.g. low cement castables (LCCs) or ultra low cement castables (ULCCs).

Fluidizers are generally organic or inorganic additives which reduce the water requirement (demand) of unshaped refractory compositions, in particular castables. Such fluidizers either improve the processibility of the refractory composition at a given water content or they enable the amount of water added to be reduced while maintaining the consistency of the composition.

Refractory compositions comprising alumina cement are ones in which a calcium aluminate cement (synonyms: alumina cement, high-alumina cement) function as hydraulic binder. These cements are based on $Al_2O_3$-rich calcium or barium (sometimes also strontium) aluminates and have an $Al_2O_3$ content of ≧35%. The classification of the cement content is determined by the content of CaO as hydrating element. The compositions are thus referred to as

| | |
|---|---|
| MCCs (medium cement castables) | >2.5% of CaO |
| LCCs (low cement castables) | ≦2.5% (min. 1.0%) of CaO |
| ULCCs (ultra low cement castables) | ≦1.0% (min. 0.2%) of CaO |

[Gerald Routschka, Pocket manual refractory materials, Vulkan-Verlag 1997, Essen, p. 184]

Refractory compositions are classified according to various criteria, e.g. according to the particle size of the raw materials. Thus, a standard refractory castable has the following composition:

| | Particle size |
|---|---|
| 35% | 1–5 mm |
| 30% | 0.1–1 mm |
| 35% | <0.1 mm |

Classification according to raw materials is also customary, typical raw materials are: andalusite, kyanite, mullite, bauxite, flint clays, corundum, magnesia, alumina, dolomite, silicon carbide, zirconia, etc.

Refractory compositions further comprise hydraulic binders such as alumina cements, phosphates and alkali metal silicates (Gerald Routschka, Pocket manual refractory materials, Vulkan-Verlag 1997, Essen, pp. 25–37).

It is known that polyacrylates and polyphosphates can be used as fluidizers for refractory compositions comprising alumina cement, with polyacrylates giving good flowability and a good saving of water (N. Bunt, et al., LAFARGE, UNITECR; Vol, 3, p. 1347, 1997, New Orleans). The use of different types of dispersant enables the water content of free-flowing compositions to be reduced to 5.0–6.0% by weight (based on the total weight of ingredients). This also results in low porosity values and in increased strength values, which in turn leads to a longer life.

Owing to the ever increasing demands made on unshaped refractory products in terms of quality of the compositions and subsequently also their life, there has been no lack of attempts to improve the flow properties or the proportion of water necessary by addition of other organic compounds, e.g. citric acid.

However, it has been found that the proportion of water in such combinations could be decreased only insignificantly, and in many cases the life is still not satisfactory.

More recently developed graft polymers based on polyalkylene oxides as fluidizers for binder suspensions comprising alumina cement (cf. DE 198 08 314 and N. Bunt, et al.; LAFARGE, UNITECR; Vol. 3, p. 1347, 1997, New Orleans) make it possible to produce free-flowing refractory compositions, particularly ones based on alumina, using a minimal amount of make-up water. However, they have the disadvantage that the addition of microsilica, a customary and therefore widespread additive for refractory compositions, reduces their effect or sometimes even makes them completely ineffective.

The hitherto unsatisfactory state of the art therefore leads to the objective of developing fluidizers and/or setting retarders for refractory compositions comprising alumina cement which do not suffer from the reduction in activity on addition of microsilica and which allow, for a minimal amount of make-up water, the production of free-flowing refractory compositions which can be deaerated or densified without use of vibrators.

This object is achieved as set forth herein by the use of water-soluble copolymers which have been prepared from at least two monomers selected from among a) 5–90% by weight of a monomer (mixture) of the formula I

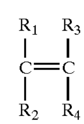

where $R_1$=H or —$CH_3$, $R_2$ and $R_3$ are each, independently of one another, H or —COOH and $R_4$=H, —COOH or —$CH_2$COOH, or $R_2$ and $R_4$ together form a

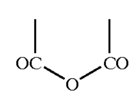

group or $R_3$ and $R_4$ together form a

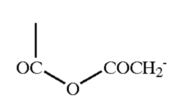

group wherein $R_3$ and $R_4$ are different and are each H or —COOH where $R_1$=H and $R_2$=—COOH, $R_3$=—COOH and $R_4$=—$CH_2$COOH when $R_1$ and $R_2$ are each H, $R_2$ and $R_4$ are different and are each H or —COOH when $R_1$=—$CH_3$ and $R_2$=—COOH, $R_2$ and $R_4$ together form a

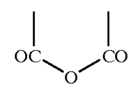

group when $R_1$ and $R_3$ are each H or $R_1$=$CH_3$ and $R_3$=H, and $R_3$ and $R_4$ together form a

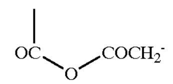

group when $R_1$ and $R_2$ are each H, or a corresponding alkali metal, alkaline earth metal or ammonium salt thereof, and/or b) 5–90% by weight of a monomer (mixture) selected from the group consisting of 2-acrylamido-2-methylpropanesulfonic acid, vinylsulfonic acid, vinylphosphonic acid, stryrenesulfonic acid, 2-acrylamido-2-methylpropionic acid and their alkali metal, alkaline earth metal and ammonium salts and sodium methallylsulfonate, and/or c) 5–90% by weight of a monomer (mixture) selected from the group consisting of acrylic acid, methacrylic acid, N-vinylpyrrolidone, N,N-dimethylacrylamide, acrylamide and methacrylamide and their corresponding alkali metal, alkaline earth metal and ammonium salts, as fluidizers and/or setting retarders for refractory compositions comprising alumina cement.

In the industrial use of the copolymers, it has, quite surprisingly, been found that the copolymers, whose composition can vary widely, not only have the desired fluidizing properties but also significantly delay the curing of the refractory compositions, which additionally allows significantly longer processing times and was not to be expected.

The component a) is a dicarboxylic acid. Although a dispersant action of copolymers of aliphatic, monoethylenically unsaturated dicarboxylic acids and unsaturated monomers has previously been described, they have been used exclusively as additives for drilling fluids or for reducing deposits (EP-A 398 724).

Among the possible components a) encompassed by the formula I, maleic acid, maleic anhydride, fumaric acid, itaconic acid, itaconic anhydride and/or citraconic acid have been found to be particularly useful for giving the copolymers the desired properties.

Among the many percentage compositions which are likewise possible, preference is given to those which comprise 20–80% of the component a) and/or 10–70% of the component b) and/or 10–70% of the component c).

Copolymers which have been found to be most suitable for fluidizing refractory compositions comprising alumina cement are ones which have a mean molecular weight $M_w$ of <50,000 and preferably of from 1,000 to 15,000. In this context, it is advisable to determine the molar masses by means of GPC. A polyacrylate having a mean molecular weight $M_w$=4,500 should be used as standard.

The copolymers to be used according to the invention can be prepared in a manner known per se by reacting the monomers at temperatures of from −10 to +100° C., preferably at from 20 to 80° C., in the presence of suitable polymerization catalysts (Polymer Handbook, Third Edition, Brandrup, Immergut, John Wiley and Sons, 1989, p. II/1–II/59). The polymerization is advantageously carried out in the aqueous phase, but, if desired, aqueous solutions of water-miscible solvents such as methanol, ethanol or tert-butyl alcohol can also serve as polymerization medium. As polymerization catalysts, it is possible to use known initiator systems based on organic or inorganic compounds. Preference is given to per compounds such as benzoyl peroxide, acetyl peroxide, tert-butyl hydroperoxide or alkali metal peroxodisulfates and ammonium peroxodisulfate, redox systems or azobisisobutyramidine dihydrochloride. The addition of cocatalysts such as traces of copper, iron or cobalt salts or mercaptans may be advantageous.

Subsequent to the actual polymerization, the carboxyl functions can be converted partly or completely into the salt form by reaction with bases. This reaction can be carried out using the customary basic substances such as alkali metal and alkaline earth metal compounds or ammonia, with the pH preferably being set to from 6.5 to 9.5.

The copolymers are obtained as viscous, preferably aqueous solutions. According to the invention, they can readily be used in this form. If use of the copolymers in solid form is intended, the polymer solutions obtained can be processed further by evaporation or drying processes, e.g. spray drying or drum drying.

The copolymers obtained in this way by known methods are thus, according to the invention, most suitable as fluidizers for refractory compositions comprising alumina cement, e.g. low cement castables (LCCs) or ultra low cement castables (ULCCs), to which they are, according to the invention, added in an amount of from 0.01 to 10% by weight, particularly preferably in an amount from 0.05 to 1.0% by weight. Suitable hydraulic binders are especially alumina cements and suitable ceramic binders are silicate compounds, e.g. microsilica, in an amount of from 0 to 20% by weight and preferably aluminum oxide compounds, e.g. andalusite, bauxite, corrundum, clay and spinels, which are present in an amount of from 1 to 100% by weight, in each case based on the solids content of the refractory composition. For use according to the invention, the copolymers can be used in liquid form or as powders, with the liquid form generally being a solution in water, and the concentration can vary depending on the field of application and the method of use.

For use according to the invention, the copolymers can also be admixed with quality-improving additives in the form of finely divided silica, powdered lime, limestone, soda or potash, which are then present in the copolymers in amounts of from 1 to 30% by weight, based on the dry weight of the polymers.

In a preferred embodiment, the invention further provides for the copolymers to be combined with known, customary fluidizers for refractory compositions and/or with other additives in an amount of from 0.1 to 95% by weight, based on the solids content of the polymers, and, if desired, to be processed further as described above. Typical dispersants or additives of this type are, for example, naphthalenesulfonate-formaldehyde condensation products, sulfonated melamine-formaldehyde condensation products, ketone-formaldehyde-sulfite condensation products, polycarboxylates, lignosulfonates, hydroxycarboxylates, polyphosphates, aromatic sulfonate derivatives, phosphonates, citrates or aromatic hydroxycarboxylic acids or their salts.

Examples of other additives which may likewise be added to the copolymers for the application claimed are air pore formers, accelerators, retarders, antifoams, foaming agents and stabilizers.

The present invention thus serves to influence the flow bahavior of a refractory mixture by using an effective amount of the polymers described or a combination thereof with quality-improving additives, customary fluidizers or other additives for refractory compositions in a ready-to-use mixture. The amount employed naturally depends on the refractory composition itself and is generally selected so that the latter acquires the desired consistency or processibility with an appropriate reduction in the amount of water. As already stated, it was completely unexpectedly found when using the water-soluble copolymers according to the invention that the copolymers can additionally exercise significant retarding influences on the curing behavior of refractory compositions, which makes the polymers used according to the invention simultaneously suitable as setting retarders. Setting retarders are additives which lengthen the time for hydraulic setting of a cement.

In every case, the present invention overcomes the greatest previous disadvantage of strongly water-reducing fluidizers for refractory compositions, as in the case of, for example, the known graft polymers, namely the drop in effectiveness when microsilica is present in the refractor compositions comprising alumina cement.

In particular, the use of a three-component water-soluble polymer comprising 5–90% by weight of a component a), preferably of the maleic acid, fumaric acid or itaconic acid type, 5–90% by weight of a component b) consisting essentially from the group consisting of 2-acrylamido-2-methylpropanesulfonic acid, vinylsulfonic acid and vinylphosphonic acid, and 5–90% by weight of the component c) comprising acrylic acid, methacrylic acid, acrylamide or methacrylamide as fluidizer for refractory compositions comprising alumina cement is described. The copolymer, which has a preferred molecular weight $M_w$ of <50,000, can also be combined with further quality-improving additives such as silica, lime or soda and further customary additives for refractory compositions.

The following examples illustrate the advantages of the present invention.

EXAMPLES

1) Preparative examples

Example 1

In a 1 l reaction vessel provided with reflux condenser, stirrer, thermometer, dropping funnel and nitrogen inlet, 98 g of maleic anhydride, 103.5 g of 2-acrylamido-2-methylpropanesulfonic acid and 36 g of acrylic acid were dissolved in 480 g of water under a nitrogen atmosphere. While passing nitrogen into the vessel, the reaction solution was heated to 60° C. in a water bath and 4.3 g of ammonium peroxodisulfate and 8.5 g of 2-mercaptoethanol in 20 g of water were added dropwise. The reaction mixture was stirred under nitrogen for 1.5 hours at 70° C. It was then cooled to room temperature and neutralized to pH 7 using sodium hydroxide. The resulting product was a clear polymer solution having a solids content (SC) of 32% by weight and a molecular weight $M_w \approx 2{,}500$.

Example 2

43.5 g of acrylic acid, 80 g of maleic anhydride, 20 g of itaconic acid and 103.5 g of 2-acrylamido-2-methylpropanesulfonic acid were reacted by a method analogous to Preparative Example 1. The resulting product was a clear polymer solution having a solids content (SC) of 32% by weight and a molecular weight $M_w \approx 2{,}000$.

Example 3

103.5 g of 2-acrylamido-2-methylpropanesulfonic acid, 21.6 g of acrylic acid and 56.1 g of itaconic anhydride were reacted in the presence of 2.5 g of ammonium peroxidedisulfate and 5.0 g of 2-mercaptoethanol using a method analogous to Preparative Example 1. The resulting product was a clear polymer solution having a solids content (SC) of 26% by weight and a molecular weight $M_w \approx 3{,}000$.

2) Use example according to the invention

The following examples show the fluidizing action of a commercial polyacrylate fluidizer compared to the fluidizing action according to the invention of the copolymers obtained as described in Preparative Examples 1–3:

The flowability was determined on a refractory concrete having the following composition:

| | | |
|---|---|---|
| Tabular alumina | 3–6 mesh | 26% by weight |
| 6–10 mesh | 5% | by weight |
| 8–14 mesh | 9% | by weight |
| 14–28 mesh | 14% | by weight |
| 28–48 mesh | 11% | by weight |
| 48–200 mesh | 8% | by weight |
| −20 μm B | 6% | by weight |
| Reactive alumina | | 2% by weight |
| Alumina cement ($70\%\ Al_2O_3$) | | 1.5% by weight |
| Microsilica | | 7% by weight |
| Fluidizer | | 0.05% by weight[1)] |
| Make-up water | | 4.2% by weight |

[1)]The amount of fluidizer and make-up water added in each case reported in % by weight based on the refractory mixture.

The free-flowing refractory composition was prepared and tested in accordance with ENV standard 1402-4. Here, the mixture is placed in a cone having a diameter at the bottom of 10 cm, a diameter at the top of 7 cm and a height of 8 cm and the cone is lifted off in an upward direction. The diameter of the spread-out cake in cm as a function of time indicates the flowability of the refractory composition.

The values obtained in the measurements using the copolymers proposed according to the invention are listed in Table 1. For comparison, the flowability of the refractory composition without addition of fluidizers (C1) and using the commercial fluidizer based on polyacrylate (C2) are shown:

TABLE 1

| | | Flow measure in [cm] after | | |
|---|---|---|---|---|
| | Fluidizer | 10 min | 30 min | 60 min |
| Comparison C1 | — | n.m. | n.m. | n.m. |
| Comparison C2 | Polyacrylate | n.m. | n.m. | n.m. |
| Invention | Example 1 | 16.2 | 16.0 | 15.5 |

TABLE 1-continued

| | Flow measure in [cm] after | | |
|---|---|---|---|
| Fluidizer | 10 min | 30 min | 60 min |
| Example 2 | 17.3 | 17.0 | 16.5 |
| Example 3 | 18.0 | 17.4 | 17.1 |

n.m.: not measurable [the cake does not spread out after lifting off the cone, but remains standing because of an excessively high viscosity.]

What is claimed is:

1. A method of fluidizing or retarding the setting of a refractory composition comprising alumina cement comprising:

preparing a refractory composition by admixing a refractory composition comprising alumina cement with a water-soluble copolymer wherein said water-soluble copolymer is prepared from at least two monomers selected from the group consisting of:

a) 5–90% by weight of a monomer (mixture) of the formula I

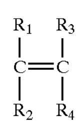

where $R_1$=H or —$CH_3$, $R_2$ and $R_3$ are each, independently of one another, H or —COOH and $R_4$=H, —COOH or —$CH_2$COOH, or $R_2$ and $R_4$, together form a

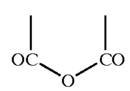

group or $R_3$ and $R_4$ together form a

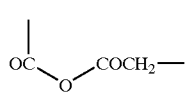

group, where $R_3$ and $R_4$ are different and are each H or —COOH when $R_1$=H and $R_2$=—COOH, $R_3$=-COOH and $R_4$=—COOH when $R_1$ and $R_2$ are each H, $R_3$ and $R_4$ are different and are each H or —COOH when $R_1$=-$CH_3$ and $R_2$=—COOH, $R_2$ and $R_4$ together form a

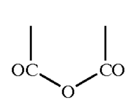

group, when $R_1$ and $R_3$ are each H or $R_1$=$CH_3$ and $R_3$=H, and $R_3$ and $R_4$ together form a

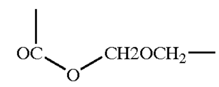

group, when $R_1$ and $R_2$ are each H, or a corresponding alkali metal, alkaline earth metal or ammonium salt thereof, or b) 5–90% by weight of a monomer (mixture) selected from the group consisting of 2-acrylamido-2-methylpropanesulfonic acid, vinylsulfonic acid, vinylphosphonic acid, stryrenesulfonic acid, 2-acrylamido-2-methylpropionic acid and their alkali metal, alkaline earth metal and ammonium salts and sodium methallysulfonate, or c) 5–90% by weight of a monomer (mixture) selected from the group consisting of acrylic acid, methacrylic acid, N-vinylpyrrolidone, N, N-dimethylacrylamide, acrylamide and methacrylamide and their corresponding alkali metal, alkaline earth metal and ammonium salts, as fluidizers or setting retarders for refractory compositions comprising alumina cement; wherein the water soluble copolymer is added in an amount sufficient to impart a fluidizing effect or to retard the setting of the refractory composition, wherein said refractory composition has a particle size distribution of 35% of from 1–5 mm, 30% 0.1 to 1 mm, and 35% less than 0.1 mm, and wherein said refractory composition further comprises from 1 to 100% by weight, based on the solids content of the refractory composition, of a ceramic binder that is an aluminum oxide compound.

2. The method of claim 1, wherein component a) is at least one component selected from the group consisting of maleic acid, maleic anhydride, fumaric acid, itaconic acid, itaconic anhydride and citraconic acid.

3. The method of claim 1, wherein said water-soluble copolymer comprises from 20 to 80% by weight of component a) or form 10 to 70% by weight of component b) or from 10 to 70% by weight of component c).

4. The method of claim 1, wherein said water-soluble copolymer has a mean molecular weight $M_w$ of <50,000

5. The method of claim 4, wherein the mean molecular weight is from 1,000 to 15,000.

6. The method of claim 1, wherein said water-soluble copolymer is included in an amount of from 0.01 to 10% by weight based on the solids content of the refractory composition.

7. The method of claim 5, wherein said water soluble copolymer is included in an amount of from 0.05 to 1.0% by weight based on the solids content of the refractory composition.

8. The method of claim 1, wherein the water-soluble copolymer further comprises from 1 to 30% by weight, based on the dry weight of the copolymers, of quality-improving additives.

9. The method of claim 8, wherein said quality improving additive is selected from the group consisting of finely divided silica, powdered lime, limestone, soda and potash.

10. A method of fluidizing or retarding the setting of a refractory composition comprising alumina cement comprising:

preparing a refractory composition by admixing a refractory composition comprising alumina cement with a water-soluble copolymer wherein said water-soluble copolymer is prepared from at least two monomers selected from the group consisting of:

a) 5–90% by weight of a monomer (mixture) of the formula I

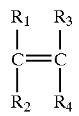

where $R_1$=H or —$CH_3$, $R_2$ and $R_3$ are each, independently of one another, H or —COOH and $R_4$=H, —COOH or —$CH_2COOH$, or $R_2$ and $R_4$, together form a

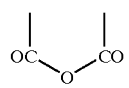

group, or $R_3$ and $R_4$ together form a

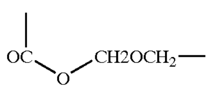

group, where $R_3$ and $R_4$ are different and are each H or —COOH when $R_1$=H and $R_2$=—COOH, $R_3$=—COOH and $R_4$=—$CH_2COOH$ when $R_1$ and $R_2$ are each H, $R_3$ and $R_4$ are different and are each H or —COOH when $R_1$=—$CH_3$ and $R_2$=—COOH, $R_2$ and $R_4$ together form a

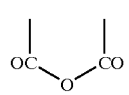

group, when $R_1$ and $R_3$ are each H or $R_1$=$CH_3$ and $R_3$=H, and $R_3$ and $R_4$ together form a

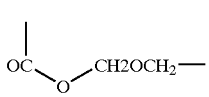

group, when $R_1$ and $R_2$ are each H, or a corresponding alkali metal, alkaline earth metal or ammonium salt thereof, or b) 5–90% by weight of a monomer (mixture) selected from the group consisting of 2-acrylamido-2-methylpropanesulfonic acid, vinylsulfonic acid, vinylphosphonic acid, stryrenesulfonic acid, 2-acrylamido-2-methylpropionic acid and their alkali metal, alkaline earth metal and ammonium salts and sodium methallysulfonate, or c) 5–90% by weight of a monomer (mixture) selected from the group consisting of acrylic acid, methacrylic acid, N-vinylpyrrolidone, N, N-dimethylacrylamide, acrylamide and methacrylamide and their corresponding alkali metal, alkaline earth metal and ammonium salts, as fluidizers or setting retarders for refractory compositions comprising alumina cement; wherein the water soluble copolymer is added in an amount sufficient to impart a fluidizing effect or to retard the setting of the refractory composition, wherein said refractory composition has a particle size distribution of 35% of from 1–5 mm, 30% 0.1 to 1 mm, and 35% less than 0.1 mm, and wherein the refractory composition further comprises a ceramic binder comprising a compound selected from the group consisting of andalusite, bauxite, corundum, spinels and clays, and up to 20% by weight of a silicate compound.

11. The method of claim 1, wherein said the water-soluble copolymer further comprises an additional fluidizers or additives for a refractory compositions in an amount of from 0.1 to 95% by weight, based on the solids content of the polymers.

12. The method of claim 11, wherein said additive for a refractory composition is selected from the group consisting of an air pore former, an accelerator, a retarder, an antifoam, a foaming agent and a stabilizer.

13. A method of preparing a refractory composition comprising:

admixing a refractory composition comprising alumina cement with a water-soluble copolymer wherein said water-soluble copolymer is prepared from at least two monomers selected from the group consisting of:

a) 5–90% by weight of a monomer (mixture) of the formula I

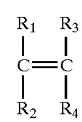

where $R_1$=H or —$CH_3$, $R_2$ and $R_3$ are each, independently of one another, H or —COOH and $R_4$=H, —COOH or —$CH_2COOH$, or $R_2$ and $R_4$, together form a

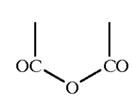

group, or $R_3$ and $R_4$ together form a

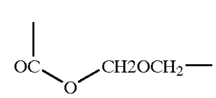

group, where $R_3$ and $R_4$ are different and are each H or —COOH when $R_1$=H and $R_2$=—COOH, $R_3$=—COOH and $R_4$=—$CH_2COOH$ when $R_1$ and $R_2$ are each H, $R_3$ and $R_4$ are different and are each H or —COOH when $R_1$=—$CH_3$ and $R_2$=—COOH, $R_2$ and $R_4$ together form a

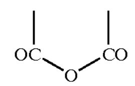

group, when $R_1$ and $R_3$ are each H or $R_1$=$CH_3$ and $R_3$=H, and $R_3$ and $R_4$ together form a

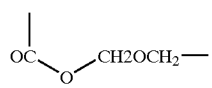

group, when $R_1$ and $R_2$ are each H, or a corresponding alkali metal, alkaline earth metal or ammonium salt thereof, or b) 5–90% by weight of a monomer (mixture) selected from the group consisting of 2-acrylamido-2-methylpropanesulfonic acid, vinylsulfonic acid, vinylphosphonic acid, stryrenesulfonic acid, 2-acrylamido-2-methylpropionic acid and their alkali metal, alkaline earth metal and ammonium salts and sodium methallysulfonate, or c) 5–90% by weight of a monomer (mixture) selected from the group consisting of acrylic acid, methacrylic acid, N-vinylpyrrolidone, N, N-dimethylacrylamide, acrylamide and methacrylamide and their corresponding alkali metal, alkaline earth metal and ammonium salts, as fluidizers or setting retarders for refractory compositions comprising alumina cement, wherein said refractory composition has a particle size distribution of 35% of from 1–5 mm, 30% 0.1 to 1 mm, and 35% less than 0.1 mm, and wherein the refractory composition further comprises from 1 to 100% by weight, based on the solids content of the refractory composition of a ceramic binder that is an aluminum oxide compound.

14. The method of claim 13, wherein component a) is at least one component selected from the group consisting of maleic acid, maleic anhydride, fumaric acid, itaconic acid, itaconic anhydride and citraconic acid.

15. The method of claim 13, wherein said water-soluble copolymer comprises from 20 to 80% by weight of component a) or from 10 to 70% by weight of component b) or from 10 to 70% by weight of component c).

16. The method of claim 13, wherein said water-soluble copolymer has a man molecular weight $M_w$ of <50,000

17. The method of claim 16, wherein the mean molecular weight ranges is from 1,000 to 15,000.

18. The method of claim 13, wherein said water-soluble copolymer is included in an amount of from 0.01 to 10% by weight based on the solids content of the refractory composition.

19. The method of claim 18, wherein said water soluble copolymer is included in an amount of from 0.05 to 1.0% by weight based on the solids content of the refractory composition.

20. The method of claim 13, wherein the water-soluble copolymer further comprises from 1 to 30% by weight, based on the dry weight of the copolymers, of quality-improving additives.

21. The method of claim 20, wherein said quality improving additive is selected from the group consisting of finely divided silica, powdered lime, limestone, soda and potash.

22. A method of preparing a refractory composition comprising:

admixing a refractory composition comprising alumina cement with a water-soluble copolymer wherein said water-soluble copolymer is prepared from at least two monomers selected from the group consisting of:

a) 5–90% by weight of a monomer (mixture) of the formula I

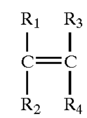

where $R_1$=H or —$CH_3$, $R_2$ and $R_3$ are each, independently of one another, H or —COOH and $R_4$=H, —COOH or —$CH_2COOH$, or $R_2$ and $R_4$, together form a

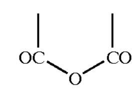

group, or $R_3$ and $R_4$ together form a

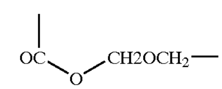

group, where $R_3$ and $R_4$ are different and are each H or —COOH when $R_1$=H and $R_2$=—COOH, $R_3$=—COOH and $R_4$=—$CH_2COOH$ when $R_1$ and $R_2$ are each H, $R_3$ and $R_4$ are different and are each H or —COOH when $R_1$=—$CH_3$ and $R_2$=—COOH, $R_2$ and $R_4$ together form a

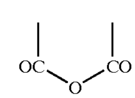

group, when $R_1$ and $R_3$ are each H or $R_1$=$CH_3$ and $R_3$=H, and $R_3$ and $R_4$ together form a

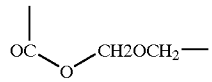

group, when $R_1$ and $R_2$ are each H, or a corresponding alkali metal, alkaline earth metal or ammonium salt thereof, or b) 5–90% by weight of a monomer (mixture) selected from the group consisting of 2-acrylamido-2-methylpropanesulfonic acid, vinylsulfonic acid, vinylphosphonic acid, stryrenesulfonic acid, 2-acrylamido-2-methylpropionic acid and their alkali metal, alkaline earth metal and ammonium salts and sodium methallysulfonate, or c) 5–90% by weight of a monomer (mixture) selected from the group consisting of acrylic acid, methacrylic acid, N-vinylpyrrolidone, N, N-dimethylacrylamide, acrylamide and methacrylamide and their corresponding alkali metal, alkaline earth metal and ammonium salts, as fluidizers or setting retarders for refractory compositions comprising alumina cement, wherein said refractory composition has a particle size distribution of 35% of from 1–5 mm, 30% 0.1 to 1 mm, and 35% less than 0.1 mm, and wherein the composition further comprises a ceramic binder comprising a compound selected from the group consisting of andalusite, bauxite, corundum, spinels and clays, and up to 20% by weight of a silicate compound.

23. The method of claim 13, wherein said the water-soluble copolymer further comprises an additional fluidizers or additives for a refractory compositions in an amount of from 0.1 to 95% by weight, based on the solids content of the polymers.

24. The method of claim 23, wherein said additive for a refractory composition is selected from the group consisting of an air pore former, an accelerator, a retarder, an antifoam, a foaming agent and a stabilizer.

25. The method of claim 10, wherein said silicate compound is microsilica.

26. The method of claim 22, wherein said silicate compound is microsilica.

* * * * *